United States Patent [19]

Umeno et al.

[11] Patent Number: 5,570,458
[45] Date of Patent: Oct. 29, 1996

[54] MANIPULATOR TRACKING APPARATUS AND METHOD FOR ACCURATELY TRACKING A PATH FOR SENSORS IN LOW RELIABILITY CONDITIONS

[75] Inventors: Akira Umeno, Koganei; Kiyoshi Nonaka, Tokyo; Takao Kakizaki, Kodaira, all of Japan

[73] Assignee: Nippon Telegraph and Telephone Corporation, Tokyo, Japan

[21] Appl. No.: 411,996

[22] Filed: Mar. 28, 1995

[30] Foreign Application Priority Data

Mar. 29, 1994 [JP] Japan .................................. 6-059122

[51] Int. Cl.[6] .................................................. G05B 19/04
[52] U.S. Cl. ........................... 395/88; 395/80; 395/85; 395/86; 364/424.02; 364/443; 901/9; 901/32; 901/47
[58] Field of Search ............................ 395/88, 86, 80, 395/85; 364/424.02, 443, 513; 901/9, 32, 47

[56] References Cited

U.S. PATENT DOCUMENTS

| 4,380,696 | 4/1983 | Masaki | 219/124.34 |
| 4,819,167 | 4/1989 | Cheng et al. | 364/167.01 |
| 4,945,493 | 7/1990 | Huang et al. | 364/513 |
| 5,006,999 | 4/1991 | Kuno et al. | 364/513 |
| 5,363,305 | 11/1994 | Cox et al. | 364/443 |

*Primary Examiner*—Robert W. Downs
*Assistant Examiner*—A. Katbab
*Attorney, Agent, or Firm*—Finnegan, Henderson, Farabow, Garrett & Dunner, L.L.P.

[57] ABSTRACT

A tracking apparatus and method for controlling the position and movement of a manipulator which holds an effector. An actual work path drawn on a workpiece is detected by a sensor. Predetermined taught path data is amended according to the detected work path, and the effector held by the manipulator is drawn to exactly track the work path on the workpiece. The effector is controlled so that the effector tracks the work path accurately even under conditions when detection data from the sensor has low reliability or contains errors.

18 Claims, 6 Drawing Sheets

MANIPULATOR TRACKING APPARATUS AND METHOD FOR ACCURATELY TRACKING A PATH FOR SENSORS IN LOW RELIABILITY CONDITIONS

BACKGROUND OF THE INVENTION

1. Field of the Invention

The present invention relates to a tracking apparatus and a tracking method for controlling the position and movement of a manipulator which holds an effector. More precisely, the present invention relates to an apparatus whereby an actual work path drawn on a workpiece is detected by a sensor, predetermined taught path data are amended with reference to the detected work path, and the effector held by the manipulator is drawn to exactly track the work path on the workpiece. The present invention also relates to a method for controlling the apparatus described above so that the effector exactly tracks the actual work path on the workpiece.

2. Relevant Art

The technology for controlling a manipulator for exactly tracking a work path is a crucial technology required for performing repetitive work in an environment wherein uncertainties exist. Therefore, many studies have been made in this field. Optical sensors are often used in combination with such technologies. For example, Hanada and Hanabusa studied, in "Spatial Curve Tracking of Industrial Robots", Measurement and Automatic Control, Vol. 16, No. 5, pp 126–132, 1980, the effects of sensor feedback. In the same document, they proposed a compensator for feedback control wherein predetermined work path data and off-line actual work path data are used.

Among various methods for tracking work paths, many working examples utilize predetermined taught path data. Recently, studies have been made on the methods wherein taught data are corrected with reference to the data obtained from optical sensors. One typical example is the study by Hirai and Shibata, "Detection and Control in Arc Welding", Welding Association, 1990. A method of amending a predetermined taught path is described in this document.

The methods described above have the object of solving a problem which may potentially be caused by the errors between the predetermined geometrical data of the path and the actual location of the path; such discrepancies are caused by errors in the orientation or dimensions of the workpiece. According to the methods described above, the position and angle of the effector are controlled by correcting the predetermined geometrical data of the path, position and angle of the effector, speed of movement of the effector, etc., with reference to the actual work piece. Optical sensors am employed to detect the actual location of the welding path on the workpiece and the position and movement of the manipulator are modified so that the welding rod traces the actual working path on the workpiece.

However the technologies described above have the following problems. According to the above-described technologies, detection data of the path are utilized in amending the position and movement of the manipulator. However, if the method is used in controlling welding rods for example, the detected optical information tends to include strong noise components which often lead to erroneous positioning of the manipulator.

Therefore, in a situation as described above, the reliability of the operation of manipulators is seriously degraded if the data from optical sensors are directly used in controlling the operation of the manipulator. If the correction of the taught path is wrong clue to errors in the measurement of the actual welding path, the actual path followed by the welding rod may substantially diverge from the corrected taught path.

SUMMARY OF THE INVENTION

In light of the problems with the conventional technologies described above, the present invention was made to provide a tracking apparatus and a tracking method which are capable of control ling the effector so that the effector tracks the work path accurately even under a condition wherein detection data from sensors have low reliability or the detection data contain errors.

According to the present invention, the tracking apparatus for manipulators comprises:

a sensor, attached to an end of said manipulator along with an effector, for measuring an actual work path which leads in a path direction of said effector;

memory means for storing predetermined taught data; and calculation means for managing information;

wherein said tracking device for a manipulator sequentially corrects movement instructions for said manipulator in real time and moves said manipulator such that said effector tracks an actual work path, by calculating conversion information for converting a taught path to an actual work path by comparing actual work path information for sensing points obtained from measurement information of said sensor, and taught path information corresponding to said sensing points calculated from taught information generated by said taught data;

calculating correction information for correcting the taught path to an actual work path using multiple sets of said conversion information obtained for each sensing; and correcting said taught information using said correction information.

In the tracking apparatus for manipulators according to the present invention, errors in the measurement information do not directly influence the correction of taught data because a series of measurement information is utilized in correcting movement instructions for the manipulator. Therefore, the correction of movement of the manipulator is more reliable even in a condition wherein intensive light noises are created by welding and other operations. As a result, operation of the manipulator is reliable.

The tracking method for manipulators according to the present invention comprises the steps of:

sequentially correcting movement instructions of said manipulator by storing predetermined taught data;

measuring actual work path leading in a path direction of said effector;

calculating correction information for correcting taught information based on multiple sets of measurement information; and correcting taught information generated from said taught data using correction information.

According to the tracking method described above, the movement instructions for the manipulator are not directly influenced by the noise which may potentially be contained in the measurement information. Therefore, a tracking method which is reliable even under a situation wherein the measurement data inevitably includes errors is provided.

DETAILED DESCRIPTION OF THE INVENTION

Before the description of the present invention, a conventional tracking apparatus and a correction procedure employed in the conventional tracking apparatus is briefly described.

Figure 6:
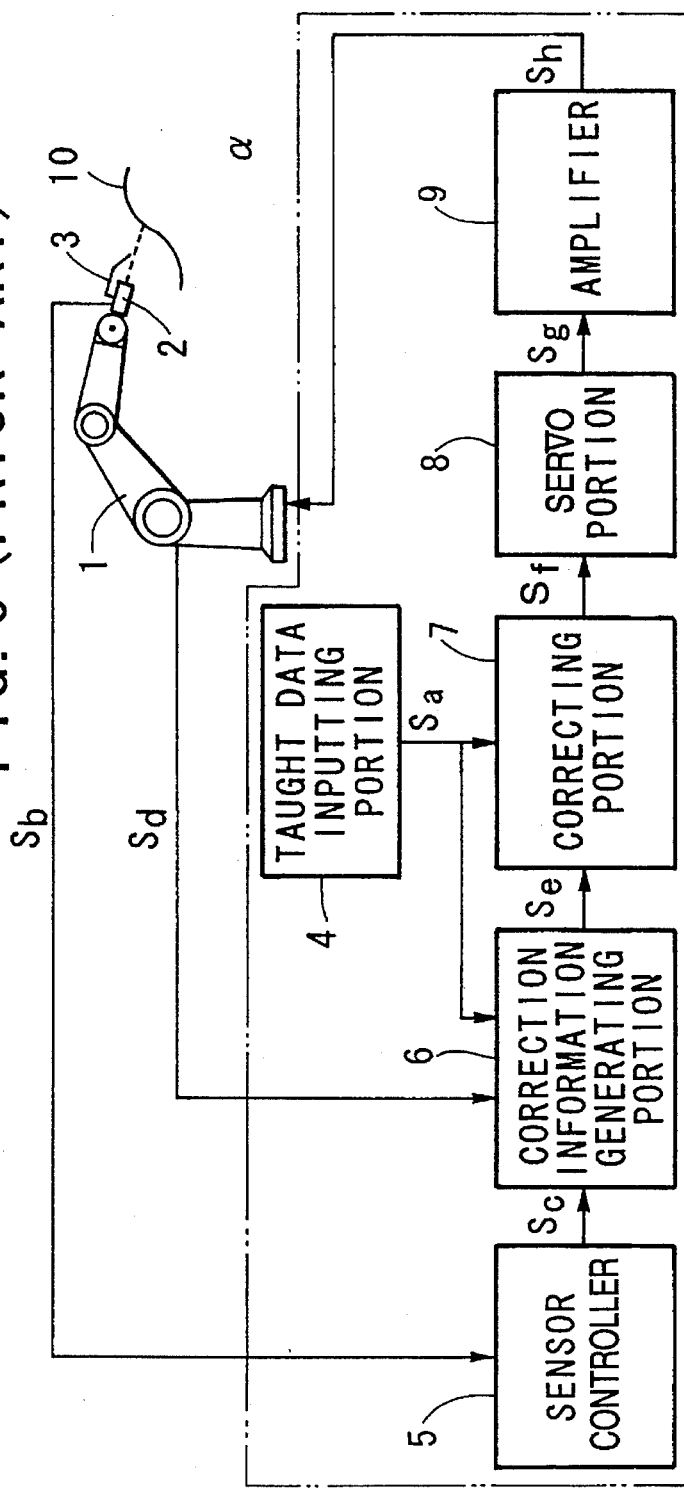
FIG. 6 shows a conventional tracking apparatus.

FIG. 6 shows a conventional tracking apparatus. As shown in the figure, the tracking apparatus of manipulator α comprises manipulator 1, optical sensor 2 and welding torch 3 both held at the end of manipulator 1, taught data inputting portion 4, sensor controller 5 for controlling sensor 2, correction information generation portion 6, correction portion 7, servo portion 8, and amplifier 9. Welding path 10 is laid on the workpiece.

As shown in FIG. 6, optical sensor 2 is disposed in the vicinity of welding torch 3 at one end of manipulator 1. Optical sensor 2 views the welding path 10 so as to sense the welding path preceding the welding as the manipulator 1 moves the optical sensor 2 and the welding torch 3. Taught data Sa are stored in taught data inputting portion 4. The taught path Pa is predetermined according to the signal Sa corresponding to taught data. As manipulator 1 moves optical sensor 2 and welding torch 3 along taught path Pa, optical sensor 2 intermittently detects target points along welding path 10 and sends detected signals Sb to sensor controller 5. Correction information generation portion 6 calculates correction information with reference to detected information Sc of sensor controller 5 and position signal Sd of welding torch 3. Correcting portion 7 generates corrected path Pb by correcting taught data on the basis of correction information signal Se from correction information generation portion 6 and taught data signal Sa, and outputs corrected path signal Sf. Servo portion 8 generates motion instruction signal Sg according to corrected path signal Sf. Amplifier 9 generates movement control signal Sh according to motion instruction signal Sg.

Figure 7:
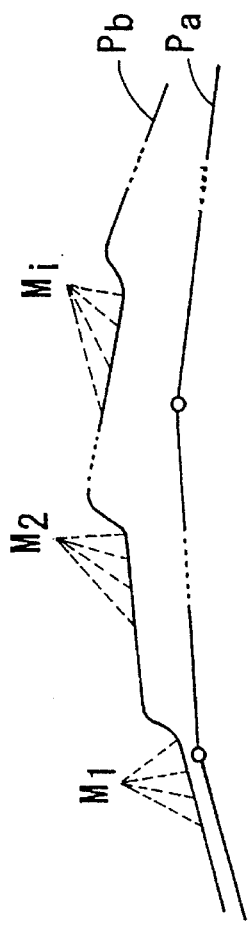
FIG. 7 shows a correction procedure according to a conventional method.

FIG. 7 is a diagram outlining positional control according to the above-described conventional control apparatus. Welding torch 3 moves along taught path Pa, or if the taught path has been corrected, along corrected path Pb. Of course, in actual practice, there is a disparity between the actual welding path 10 and taught path Pa. As shown in the same diagram, the distance between welding path 10 and welding torch 3 is calculated from measurement information signals Sc of welding points Mi (i=1, 2, 3, ...) on welding path 10 and the position of taught path welding torch 3. When the welding torch passes through the point at which the distance is minimized, the taught path Pa is shifted over, thereby generating the corrected path Pb.

Figure 1:
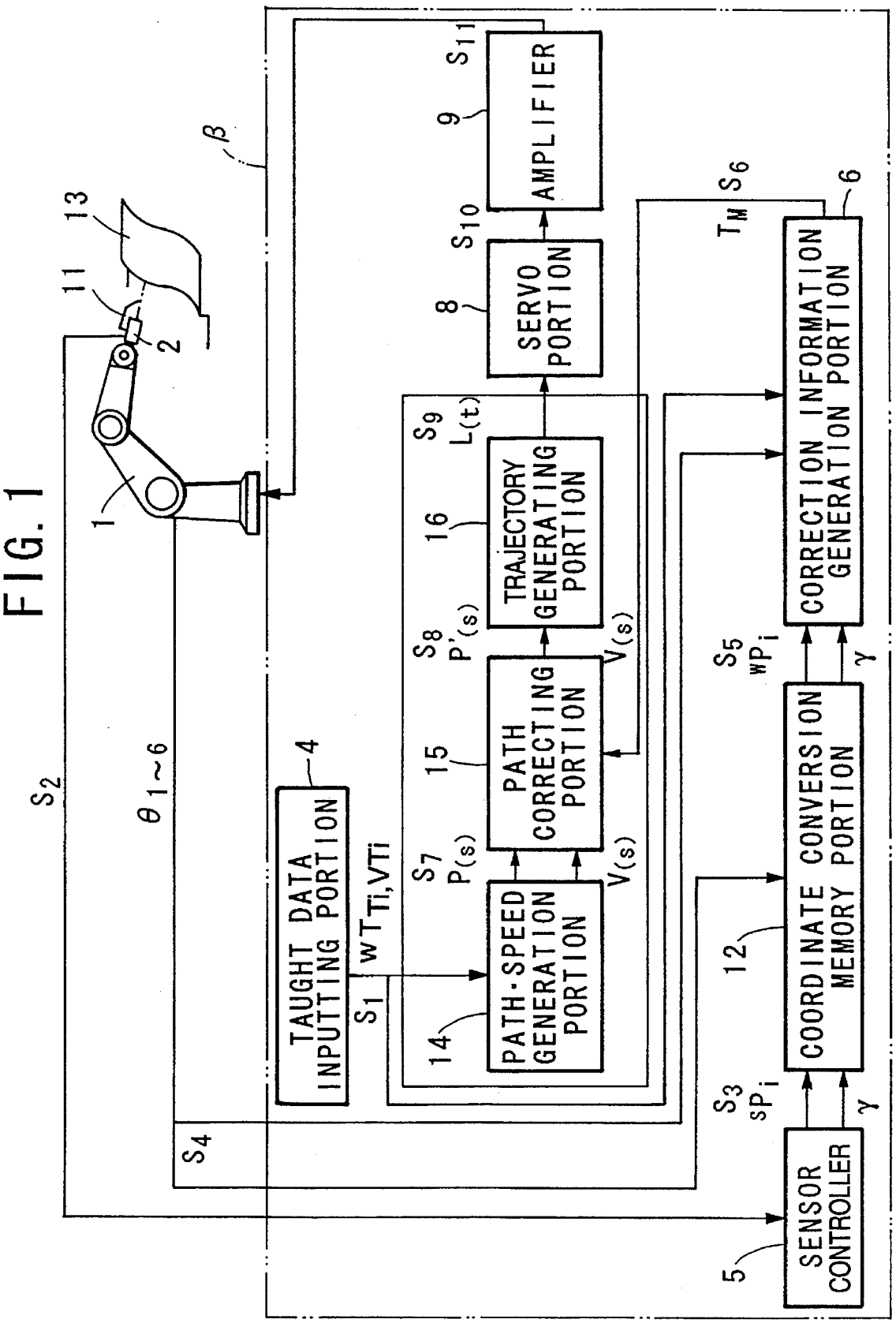
FIG. 1 is a flow diagram depicting Embodiment 1 of a tracking apparatus according to the present invention.

FIG. 1 shows the composition of a tracking device for manipulators according to Embodiment 1 of the present invention. In the diagram, the tracking device for a manipulator β which forms a feedback control circuit comprises optical sensor 2, sensor controller 5, coordinate conversion/memory portion 12, correction information generation portion 6, correction portion 7, servo portion 8 and amp portion 9, and is attached to manipulator 1 on which a processor 11 for processing an object 13 is installed. The correction portion 7 has a path/speed function generation portion 14, a path correction portion 15 and a trajectory generation portion 16. The elements which correspond to hose of the conventional tracking apparatus shown in FIG. 6 are given the same reference numerals.

The tracking apparatus of Embodiment 1 is different from the conventional tracking apparatus shown in FIG. 6 on the following points. The present embodiment has coordinate conversion/memory portion 12 between sensor controller 5 and correction information generation portion 6, and positional information signal S4 of processor 11 is inputted to said coordinate conversion/memory portion 12. Furthermore, correction portion 7 comprises path/speed function generation portion 14, path correction portion 15 and trajectory generation portion 16, and taught data signal S1 and measurement in formation signal S6 are inputted to path/speed function generation portion 14 and path correction portion 15 respectively.

The manipulator tracking procedure of the tracking apparatus for manipulators of the above-described Embodiment 1 is explained below.

First, taught data which has been stored prior to the tracking operation is read out. Then, position/orientation data $^{w}T_{Ti}$ (i=1, 2, 3, ..., n) for taught points on the processing path which have been discretely placed object being processed as CAD data, taught speed data $v_{Ti}$ (i=1, 2, 3, ..., n) relating to the movement speed of the processor are read out from the taught data input portion 4. In this case, the w in superscript on the lefthand side refers to an absolute coordinate system.

Next, at path/speed function generation portion 14, taught path function $P_T(s)$ and taught speed function $V(s)$ relating to position/orientation with the path length s from the processing start point are generated based on $^{w}T_{Ti}$ and $v_{Ti}$ received from taught data input portion 4, and the taught data $^{w}T_{Ti}$, $v_{Ti}$ and the taught information $P_T(s)$ and $V(s)$ are stored in the path/speed function generation portion 14 in the form of a coefficient matrix.

Specifically, $P_T(s)$ may for example be represented by a three dimensional function which ensures continuity over two differentiations with respect to s. This ensures the continuity of the three dimensional position, speed and acceleration of the taught trajectory L(t) which depends on time t, generated from the taught path function $P_T(s)$ and the taught speed function $V(s)$. Consequently, manipulator 1 is controlled so as to position effector 11 in accordance with given positions/orientations on the processing path on the object 13, along the divided taught trajectory L(t) at $s=s_{i-1}$ and $s=s_i$. After performing the above procedure off-line, manipulator 1 is moved and the online operation is performed.

During the on-line operation, optical sensor 2 held by manipulator 1 moves in front of effector 11, while observing the processing path with measurement movements in accordance with instructions from the sensor controller 5. Optical sensor 2 irradiates the object 13 with laser slit light, while a two dimensional light-receiving element measures the position of the slit by using the principles of triangulation. By continuously measuring these points as processing path cross-section data, the distance to the work surface of the optical cutting area is calculated. At the same time, the signal level of the received slit light and the width of the reflected slit light are outputted. Since the surface conditions of the measured object are changing, the measurement values of the signal level of the received light and the width of the reflected slit light are usually full of errors. These measurement data are sent to sensor controller 5.

Figure 4:
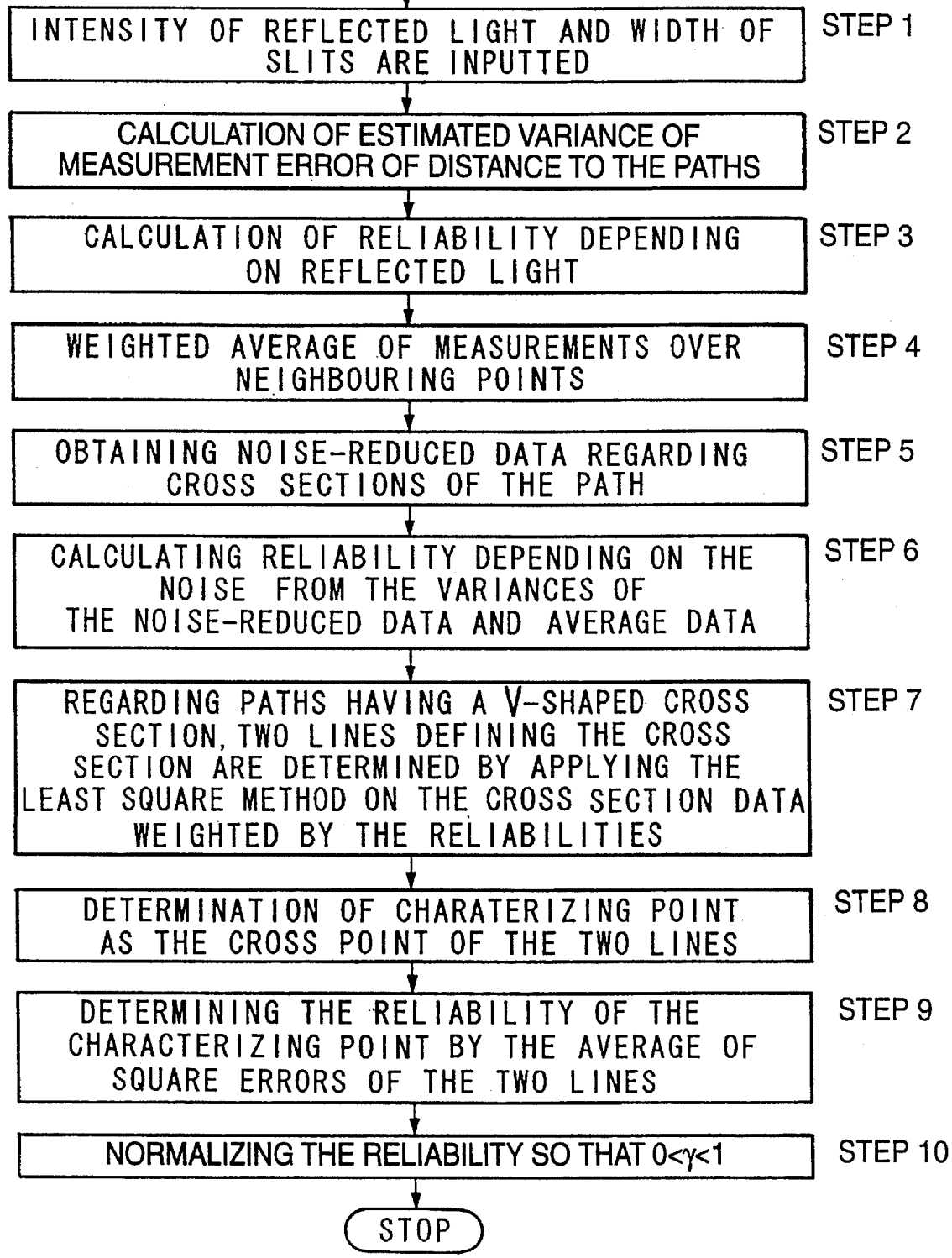
FIG. 4 is a flow diagram depicting the procedure for calculating reliability of the work path measurement.

Sensor controller 5 receives measurement data from optical sensor 2 obtained serially in time, and sequentially calculates the position of the processing path and the corresponding reliability. The specific procedure is explained with reference to FIG. 4.

First, before calculating the reliability dependent upon the reflected light (step 3), the signal level of the reflected light and the width of the slight light are inputted (step 1) and estimated values for the dispersion in the measurement errors of the distance to the path are calculated (step 2). Generally, when the reflection level is lower, the reliability of the measured distance data is lower, and when the reflection slit is wider, the reliability is lower.

Next, by taking a weighted average of data corresponding to several neighboring points using this reliability (step 4), processing path cross-section data in which the noise has been eliminated is obtained (step 5). Then, the size of the dispersion between the data after the procedure and the average values is calculated as the reliability (step 6).

Furthermore, if the processing path cross-section is V-shaped, then the cross-section data is given as a row of points having an approximate V-shape. Then, the path cross-section is approximated by the intersection of two straight lines, and the point of intersection is selected as a characteristic point of the path (step 8). For this reason, by using a least-squares method weighted by the reliability determined from the dispersion in the cross-section data in the above procedure, two straight lines are selected which accurately form the V-shape (step 7).

The average of the squared errors of these straight lines is taken, and this value is taken as the measurement reliability of the characteristic point which is the intersection of the two straight lines (step 9). This value becomes the reliability $\gamma$ indicating the accuracy of the final measurement information. The reliability $\gamma$ is most easily used in a normalized form such that $0<\gamma<1$ (step 10). This value is calculated as the measurement reliability of the characteristic point, and is sent to the coordinate conversion/memory portion 12 as signal S3 along with the position information of the characteristic point.

At the coordinate conversion/memory portion 12, the characteristic points on the processing path are converted to the absolute coordinate system, by using position information of the processor 11 obtained from the signal S3 of the position information for the characteristic points calculated by the sensor controller 5 and the signal S4 of the joint position information $\Theta_m$ (m=1, 2, . . . , 6) of the manipulator 1 during the sensor measurement, and stored. Thus, the position vector ${}^s p$ of the characteristic point is converted into an absolute coordinate vector ${}^w p$ data signal S5 and stored.

Using these characteristic point vectors ${}^w p_i$, ${}^w p_{i+1}$, . . . , ${}^w p_{i+m}$ obtained for each measurement period of optical sensor 2 and taught position/orientation information ${}^w T_{T,i}$, the correction information is calculated by the correction information generation portion 6 in real time. Specifically, discrepancies between the actual path $P_A(s)$ and the taught path $P_T(s)$ on the object 13 are corrected for translational components of the position and for rotational components with respect to the $Z_w$ axis which is the vertical axis in the absolute coordinate system. The algorithm for calculating the correction information is as follows.

(1) Correspondence Between Taught Path and Actual Path

Letting the positions corresponding to an arbitrary point $s=s_i$ on the taught path and the actual path be ${}^w p_{T,i}$ and ${}^w p_{A,i}$ respectively, the following relationship arises between the two values.

$$ {}^w p_{T,i} = T_{AT} {}^w p_{A,i} \tag{1} $$

In this case, $T_{AT}$ is a correction function which maps the taught path onto the actual path, and the amount of correction may be calculated by calculating the correction matrix $T_{AT}$. The taught position information at $s=s_i$ is written as $$ {}^w p_{T,i} = [{}^w p_{T,ix}, {}^w p_{T,iy}, {}^w p_{T,iz}, 1]^T \tag{2} $$

the actual position information is written as $$ {}^w p_{A,i} = [{}^w p_{A,ix}, {}^w p_{A,iy}, {}^w p_{A,iz}, 1]^T \tag{3} $$

and the correction information is written as follows.

$$ T_{AT} = \begin{bmatrix} R_{AT} & p_{AT} \\ 0 & 1 \end{bmatrix} \tag{4} $$

$$ = \begin{bmatrix} R_{11} & -R_{21} & 0 & p_x \\ R_{21} & R_{11} & 0 & p_y \\ 0 & 0 & 1 & p_z \\ 0 & 0 & 0 & 1 \end{bmatrix} $$

Furthermore, since the path parameter s for this case is the path length of the processing path, the trajectory from the path starting point $s=0$ to the point of the i-th measurement on the actual path $s=s_i$ is able to be approximated by straight lines drown between each measurement point if the measurement period of the optical sensor 2 is short enough. If so, then $$ s_i = \sum_{k=1}^{i} (\|{}^w p_{A,i} - {}^w p_{A,i-1}\|) \tag{5} $$

$$ = \sum_{k=1}^{i} (({}^w p_{A,ix} - {}^w p_{A,(i-1)x})^2 + ({}^w p_{A,iy} - {}^w p_{A,(i-1)y})^2 + ({}^w p_{A,iz} - {}^w p_{A,(i-1)z})^2)^{1/2} $$

From the above, it is possible to draw a correspondence between the point $s=s_i$ on the taught path and the measurement point.

(2) Calculation of the Correction Matrix $T_{AT}$

First, using the procedure explained in (1) above, the translational components $p_x$, $p_y$ and $p_z$ are calculated by finding the correspondence between a group of points on the taught path and a group of points on the actual path. If two points $s=s_i$ and $s=s_{i-1}$ on the actual path are determined from the measurement information from the optical sensor, then the following am able to be obtained from Equation (1).

$$ {}^w p_{A,i-1} = T_{AT} {}^w p_{T,i-1} \tag{6} $$

$$ {}^w p_{A,i} = T_{AT} {}^w p_{T,i} \tag{7} $$

Then, from Equation (6), $$ p_x = {}^w p_{A(i-1)x} - {}^w p_{T,(i-1)x} R_{11} + {}^w p_{T,(i-1)y} R_{21} \tag{8} $$

$$ p_y = {}^w p_{A,(i-1)y} - {}^w p_{T,(i-1)x} R_{21} - {}^w p_{T,(i-1)y} R_{11} \tag{9} $$

From Equations (6) and (7), $$p_z = \frac{({}^w p_{A,(i-1)z} - {}^w p_{T,(i-1)z}) + ({}^w p_{A,iz} - {}^w p_{T,iz})}{2} \quad (10)$$

However, $p_z$ is calculated by taking into consideration measurement errors. Next, the rotational components $R_{11}$ and $R_{21}$ will be determined. The following rotational elements can be obtained from Equations (7), (8) and (9).

Case (a): when ${}^w p_{T,iy} - {}^w p_{T,(i-1)y} \neq 0$, $$R_{11} = \frac{({}^w p_{T,iy} - {}^w p_{T,(i-1)y})({}^w p_{A,iy} - {}^w p_{A,(i-1)y}) + ({}^w p_{T,ix} - {}^w p_{T,(i-1)x})({}^w p_{A,ix} - {}^w p_{A,(i-1)x})}{({}^w p_{T,iy} - {}^w p_{T,(i-1)y})^2 + ({}^w p_{T,ix} - {}^w p_{T,(i-1)x})^2} \quad (11)$$

$$R_{21} = \frac{({}^w p_{T,ix} - {}^w p_{T,(i-1)x})}{({}^w p_{T,iy} - {}^w p_{T,(i-1)y})} R_{11} - \frac{({}^w p_{A,ix} - {}^w p_{A,(i-1)x})}{({}^w p_{T,iy} - {}^w p_{T,(i-1)y})} \quad (12)$$

Case (b): when ${}^w p_{T,iy} - {}^w p_{T,(i-1)y} = 0$, and
Case (b-1): ${}^w p_{T,ix} - {}^w p_{T,(i-1)x} \neq 0$, $$R_{11} = \frac{({}^w p_{A,ix} - {}^w p_{A,(i-1)x})}{({}^w p_{T,ix} - {}^w p_{T,(i-1)x})} \quad (13)$$

$$R_{21} = \frac{({}^w p_{A,iy} - {}^w p_{A,(i-1)y})}{({}^w p_{T,ix} - {}^w p_{T,(i-1)x})} \quad (14)$$

Case (b-2): ${}^w p_{T,ix} - {}^w p_{T,(i-1)x} = 0$, the taught path becomes aligned with the $Z_w$ direction and $T_{AT}$ is not able to be calculated solely from the position information, but in practice it is quite rare for this type of special path to exist over a long interval, and sufficient precision is able to be ensured by moving the manipulator according to the taught path.

Using the correction matrix $T_{AT}$ resulting above, a correction operation is per/brined on the taught path function $P_T(s)$ at the path correction portion 15 in the correcting portion 7. As previously mentioned, since the taught path function $P_T(s)$ is stored in the path/speed function generation portion 14 in the form of a coefficient matrix, by having $p_{AT}$ act on the position components of the coefficient matrix and $R_{AT}$ act on the orientation components, a corrected taught path $P'_T(s)$ is calculated for each measurement period of the sensor. The result is sent to the trajectory generation portion 16, and a target trajectory $L(t)$ is generated by the trajectory generation portion 16.

(3) Tracking Estimate of the Correction Matrix $T_{M,i}$

By using the target trajectory $L(t)$ shown above, even if the optical sensor occasionally measures mistaken data, the effector remains unhindered, and a reliable and accurate tracking device is able to be practicalized. Furthermore, by adding the procedure shown below, the correction matrix becomes even more reliable, and the effectiveness can be increased.

Due to factors such as errors and noise which inevitably arise during measurement, the value of the correction matrix $T_{AT}$ is different for each measurement. Therefore, in order to increase the reliability of the correction matrix, several sets of correction information are used to calculate the most appropriate correction information. Thus, the N conversion matrices obtained until $s=s_i$ are called $T_{AT,k}$ (wherein $k=i-(N-1), i-(N-1)+1, \ldots, i$), and the most appropriate conversion matrix $T_{M,i}$ for $s=s_i$ is determined by a weighted least-squares method which takes into consideration the measurement reliability $r_k$ of the measurement information. Taking $T_{M,i}$ as the following, $$T_{M,i} = \begin{bmatrix} R_{M,i} & p_{M,i} \\ 0 & 1 \end{bmatrix} \quad (15)$$

$$= \begin{bmatrix} R_{M,i,11} & -R_{M,i,21} & 0 & p_x \\ R_{M,i,21} & R_{M,i,11} & 0 & p_y \\ 0 & 0 & 1 & p_z \\ 0 & 0 & 0 & 1 \end{bmatrix}$$

a least-squares method weighted by the reliability $r_k$ is applied, and the translational components of $p_{M,i}$ become $$p_{M,i,x} = \frac{\sum_{k=i-(N-1)}^{i} r_k p_{AT,k,x}}{\sum_{k=i-(N-1)}^{i} r_k} \quad (16)$$

$$p_{M,i,y} = \frac{\sum_{k=i-(N-1)}^{i} r_k p_{AT,k,y}}{\sum_{k=i-(N-1)}^{i} r_k} \quad (17)$$

$$p_{M,i,z} = \frac{\sum_{k=i-(N-1)}^{i} r_k p_{AT,k,z}}{\sum_{k=i-(N-1)}^{i} r_k} \quad (18)$$

and the rotational components of $R_{M,i}$ become $$R_{M,i,11} = \cos(\theta_{M,Z,i}) \quad (19)$$

$$R_{M,i,21} = \sin(\theta_{M,Z,i}) \quad (20)$$

$$\theta_{AT,Z,k} = \arctan2(R_{AT,k,21}, R_{AT,k,11}) \text{ wherein}(-\pi < \theta_{AT,Z,k} \leq \pi) \quad (21)$$

$$\theta_{M,Z,k} = \frac{\sum_{k=i-(N-1)}^{i} r_k \theta_{AT,Z,k}}{\sum_{k=i-(N-1)}^{i} r_k} \quad (22)$$

Using the most appropriate conversion matrix $T_{M,i}$ resulting above, a correction procedure is performed on the taught path function in the path correction portion 15 of the correction portion 7. As already mentioned, the taught path function $P_T(s)$ is stored in the path/speed function generation portion 14 in the form of a coefficient matrix, and $T_{M,i}$ is made to act on the position components of the coefficient matrix and $R_{M,i}$ is made to act on the orientation components. Thereby the corrected paths $P_T'(s)$ are sequentially calculated for each measurement period of the sensor, and they are sent to the trajectory generation portion 16 along with the taught speed function $V(s)$.

At the trajectory generation portion 16, a target trajectory $L(t)$ which the effector is to follow is generated from the corrected path $P_T'(s)$ and the taught speed function $V(s)$. Furthermore, by solving the reverse kinematics of $L(t)$ in the absolute coordinate system, the target jointed trajectory $\theta_{dm}$ (wherein $m=1, 2, \ldots, 6$) is calculated. From the servo portion 8, a movement instruction value based on the target trajectory and the joint position information $\theta_m$ (wherein $m=1, 2, \ldots, 6$) of the manipulator is sent to the amp portion 9. With the above procedure, the operation is able to be performed by supplying drive power to the manipulator 1 based on the movement instruction values at the amp portion 9. As explained above, with the present invention, even if the optical sensor occasionally measures mistaken data, the instructions for moving the manipulator are sequentially corrected for high reliability by using the most appropriate correction values estimated from measurement information and measurement reliability as well as at least one correction value composed therefrom. Therefore, the effector is able to follow the path without hindrance which has been a problem in the past, and a tracking device with high reliability and high precision is able to be practicalized.

Figure 5:
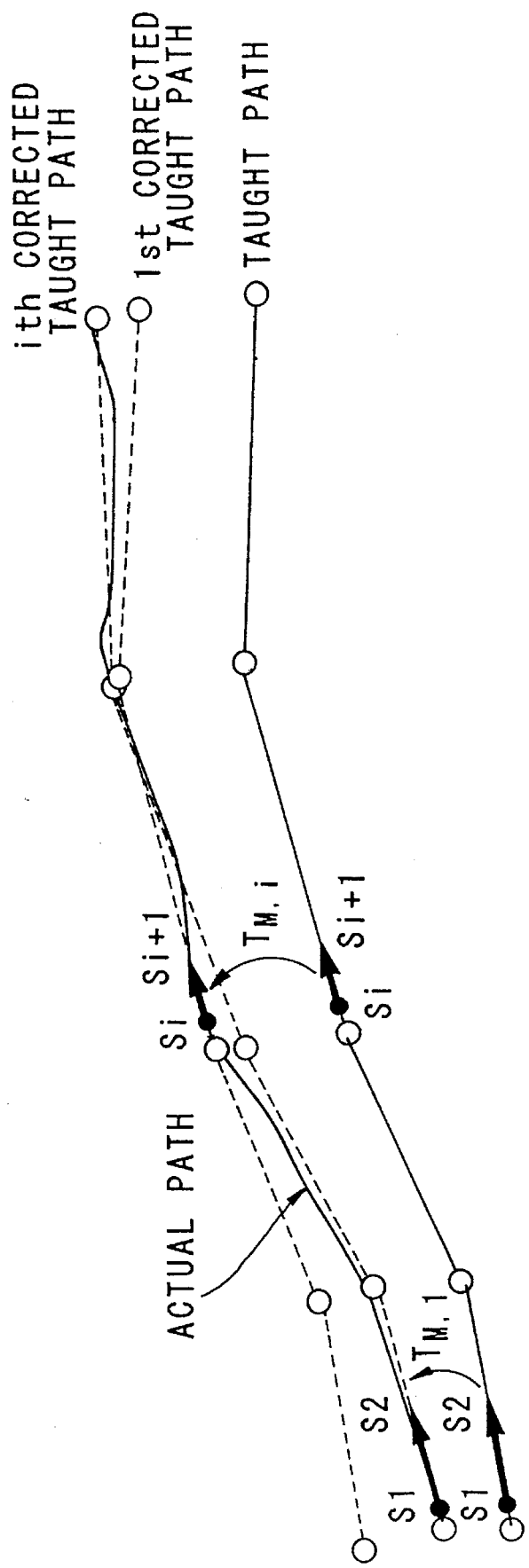
FIG. 5 is a diagram schematically depicting the correction of taught data according to the present invention.

FIG. 5 illustrates the path correction process of the present invention, in comparison to the path correction process of the prior art shown in FIG. 7. After the correction matrix $T_{M,1}$ is determined by the above-mentioned process, the taught path $P_T(s)$ is corrected by having the correction matrix $T_{M,1}$ act on the taught path $P_T(s)$. In this case, the method of the present embodiment differs from the prior art method of FIG. 7 in that (a) the correction matrix $T_{M,1}$ is not much influenced by measurement errors because the reliability of the values measured by the sensor is factored into the calculation process, and (b) both translational and rotational components are included in the correction.

As shown in the diagram, when the taught path is corrected by the correction matrix $T_{M,1}$ at the point $s=s_1$, not only does the point $s=s_1$ on the taught path align with the point $s=s_1$ on the actual path, but the vectors defined by $s_1$ and $s_2$ on both paths also become identical. This type of correction is made either for each measurement of the sensor, or at the rate of one per every few measurements. In the diagram, the results of a correction made at the point $s=s_i$ are also shown.

Figure 2:
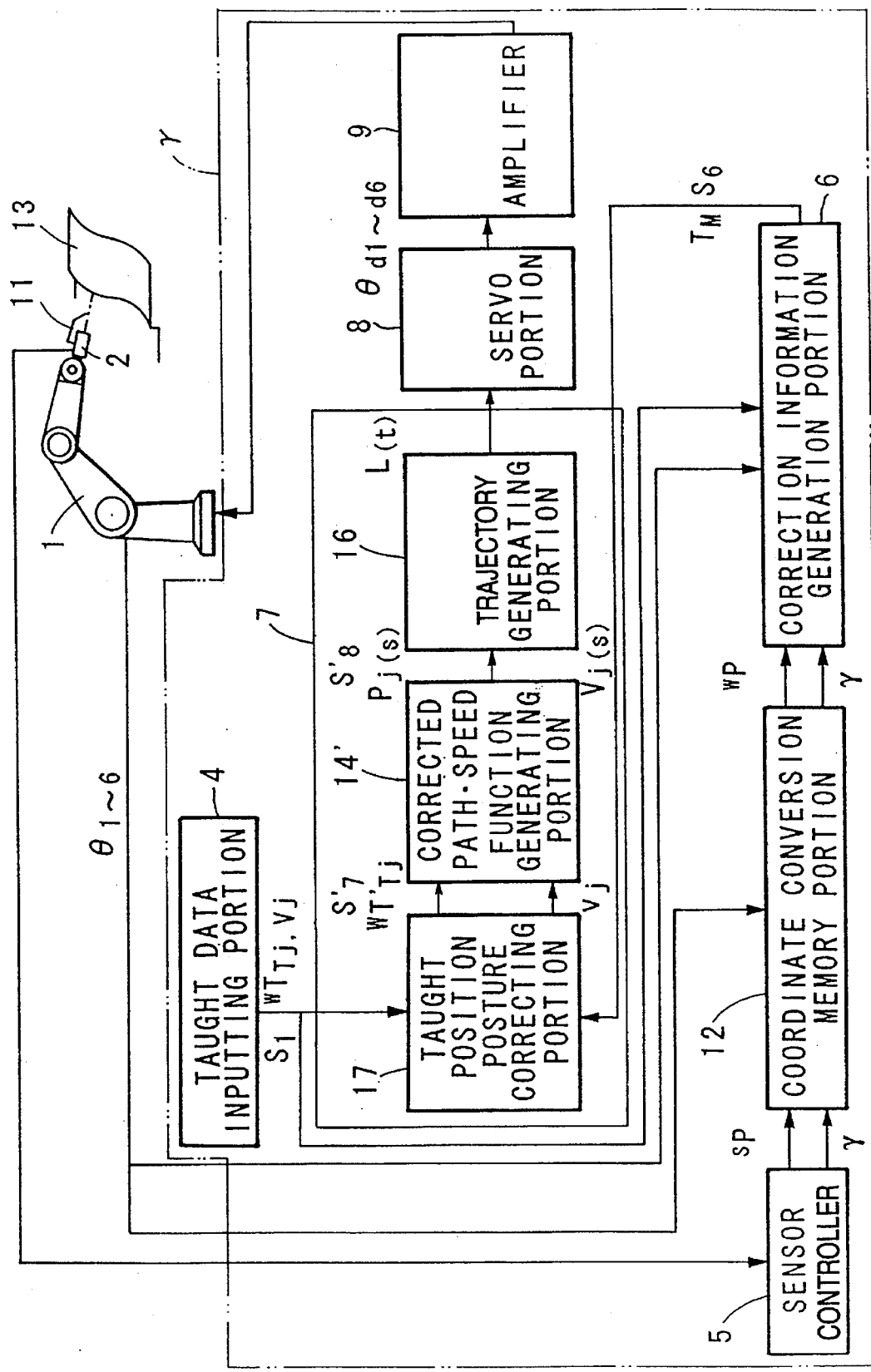
FIG. 2 is a flow diagram depicting Embodiment 2 of a tracking apparatus according to the present invention.

FIG. 2 illustrates Embodiment 2 of the present invention. In place of the path/speed function generation portion 14 and the path correction portion 15 of Embodiment 1, a taught position/orientation correction portion 17 and a correction path/speed function generation portion 14' are provided. With Embodiment 2, correction position/orientation information $^wT'T_{T,j}$ is calculated by having the most appropriate correction function act on taught position/orientation information $^wT_{T,j}$.

Figure 3:
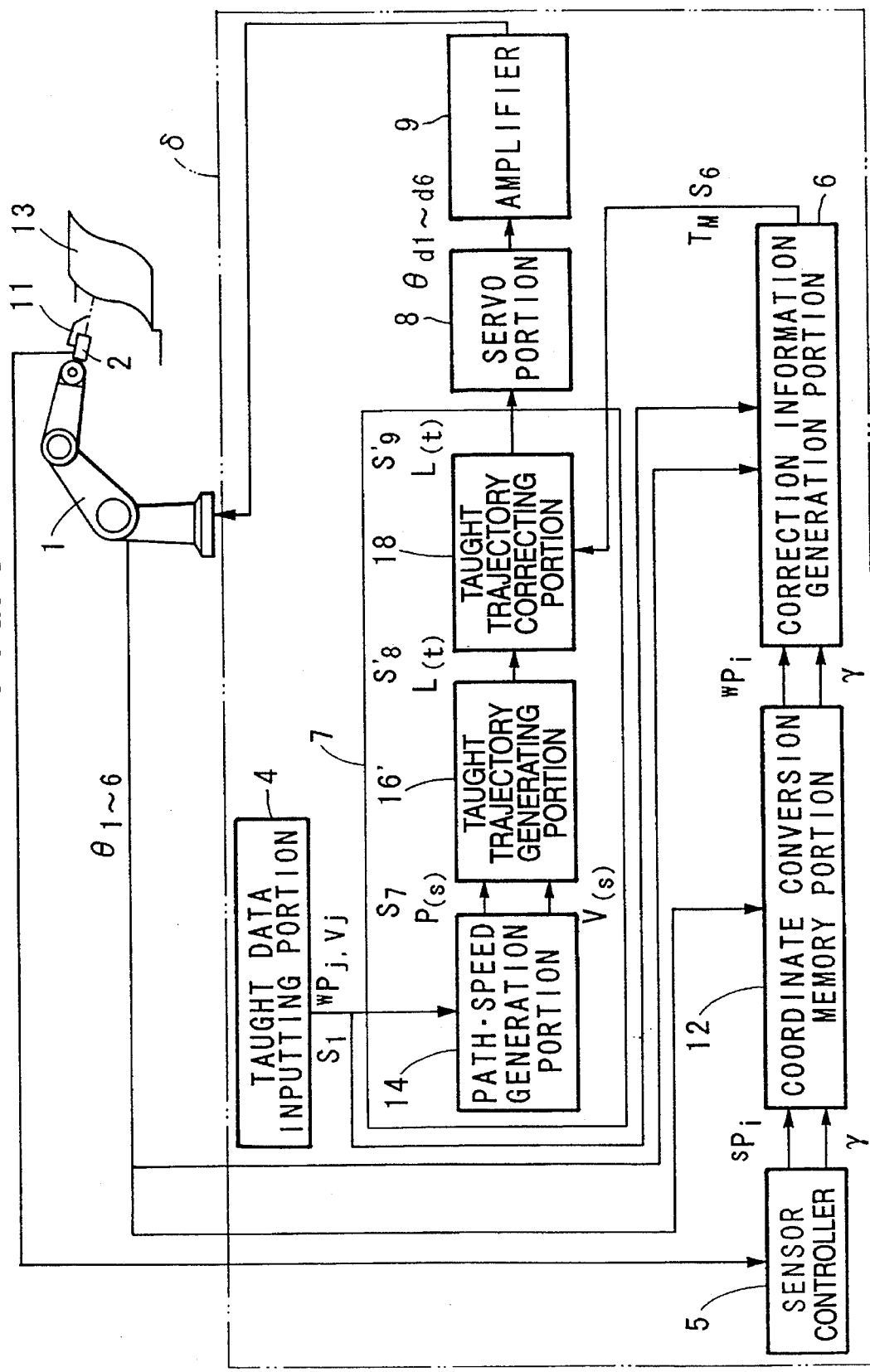
FIG. 3 is a flow diagram depicting Embodiment 3 of a tracking apparatus according to the present invention.

FIG. 3 illustrates Embodiment 3 of the present invention. In place of the path correction portion 15 and the trajectory generation portion 16 of Embodiment 1, a taught trajectory generation portion 16' and a taught trajectory correction portion 18 are provided. With Embodiment 3, the corrected trajectory L'(t) is calculated by having the most appropriate correction function act on the taught trajectory L(t).

With both of the above-mentioned Embodiments 2 and 3, the same effects as those obtained in Embodiment 1 by having the correction function act on the taught path information are obtainable.

Of course, in the embodiments given above, a laser irradiation-type optical sensor is used, but the stone effects as mentioned above can be obtained with the use of any other type of optical sensor which is at least able to measure distances and to receive the signals necessary for the calculation of measurement reliability. Additionally, the degrees of freedom of the corrections are not necessarily restricted to the degrees of freedom given above, as long as information in all three dimensions is able to be obtained by the optical sensor.

Furthermore, with the above embodiments, the path function has three dimensions, but for processing of objects having processing paths with low curvatures, the same effects are obtainable in one or two dimensions, as long as a path function which is able to satisfy the operational conditions in one or two dimensions is used.

Furthermore, the path parameters need not be restricted to the path lengths, they can be any kind of parameters with which it is possible to compare the taught path and the actual path.

Furthermore, in the above embodiments, the average of the errors between two intersecting straight lines is taken as the reliability of a characteristic point. However, it is also possible to determine the reliability through other means, such as by finding the difference between a threshold value predetermined by the work specification and the distance from such a characteristic point, normalizing the obtained value, and taking this as the reliability.

We claim:

1. A tracking device for a manipulator which holds an effector for processing objects, comprising:

a sensor, attached to an end of said manipulator along with said effector, for measuring actual work path information which leads in a path direction of said effector:

a memory device for storing predetermined taught data; and a calculation device for managing information;

wherein said tracking device sequentially corrects movement instructions for said manipulator and moves said manipulator such that said effector tracks an actual work path in real time, utilizing:

means for calculating a measurement reliability indicating an accuracy of the information measured by said sensor;

means for calculating conversion information for converting a taught path to an actual work path by comparing actual work path information for sensing points obtained from multiple sets of measurement information of said sensor weighted by said measurement reliability, and taught path information corresponding to sensing points calculated from taught information generated from said taught data;

means for calculating correction information for correcting a taught path to an actual work path using multiple sets of said conversion information obtained for each sensing; and means for correcting said taught information using said correction information.

2. The tracking device for a manipulator as claimed in claim 1, wherein said sensor repeatedly performs measurements, and the correction information is calculated from conversion information corresponding to at least two measurements.

3. The tracking device for a manipulator as claimed in claim 2, wherein said sensor repeatedly measures actual work path information, and the correction information is calculated from multiple sets of conversion information weighted by a measurement reliability, indicating the accuracy of the conversion information for each measurement, calculated from the reliability of the measurements.

4. The tracking device for a manipulator as claimed in claim 3, wherein said correction information is calculated by applying a weighted least-squares method to multiple sets of conversion information.

5. The tracking device for a manipulator as claimed in any one of claims 1, 2, 3, and 4, wherein the taught data includes either taught position information alone or taught position information and taught orientation information, which are sequentially corrected using the correction information.

6. The tracking device for a manipulator as claimed in any one of claims 1, 2, 3, and 4, wherein the taught data includes a taught path function which is sequentially corrected using the correction information.

7. The tracking device for a manipulator as claimed in any one of claims 1, 2, 3, and 4, wherein the taught data includes a taught trajectory which is sequentially corrected using the correction information.

8. The tracking device for a manipulator as claimed in any one of claims 1, 2, 3, and 4, wherein the actual work path information includes either position information alone or position information and orientation information, which are used to sequentially correct the taught information.

9. The tracking device for a manipulator as claimed in any one of claims 1, 2, 3, and 4, wherein the conversion information includes either position information alone or position information and orientation information, which are used to sequentially correct the taught information.

10. A tracking method for a manipulator which holds an effector for processing objects, comprising the steps of:

measuring measurement data using a sensor;

calculating measurement reliability indicating an accuracy of the measurement data from the sensor;

sequentially correcting movement instructions of said manipulator by:

storing predetermined taught data;

measuring actual work path information leading in a path direction of said effector;

calculating conversion information for converting a taught path to an actual work path by comparing the actual work path information for sensing points obtained from multiple sets of measurement information of said sensor weighted by said measurement reliability, and taught path information corresponding to sensing points calculated from taught information generated by said taught data;

calculating correction information for correcting taught information based on multiple sets of conversion information; and correcting said taught information using said correction information.

11. The tracking method for a manipulator as claimed in claim 10, wherein a sensor repeatedly performs measurements, and the correction information is calculated from conversion information corresponding to at least two measurements.

12. The tracking method for a manipulator as claimed in claim 11, wherein a sensor repeatedly performs measurements, and the correction information is calculated from multiple sets of conversion information weighted by measurement reliabilities indicating the accuracy of conversion matrices.

13. The tracking method for a manipulator as claimed in claim 12, wherein said correction information is calculated by applying a weighted least-squares method to multiple sets of conversion information.

14. The tracking method for a manipulator as claimed in any one of claims 10, 11, 12, and 13, wherein the taught data includes either taught position information alone or taught position information and taught orientation information, which are sequentially corrected using the correction information.

15. The tracking method for a manipulator as claimed in any one of claims 10, 11, 12, and 13, wherein the taught data includes a taught path function which is sequentially corrected using the correction information.

16. The tracking method for a manipulator as claimed in any one of claims 10, 11, 12, and 13, wherein the taught data includes a taught trajectory which is sequentially corrected using the correction information.

17. The tracking method for a manipulator as claimed in any one of claims 10, 11, 12, and 13, wherein the path information includes either position information alone or position information and orientation information, which are used to sequentially correct the taught information.

18. The tracking method for a manipulator as claimed in any one of claims 10, 11, 12, and 13, wherein the conversion information includes either position information alone or position information and orientation information, which are used to sequentially correct the taught information.

* * * * *